United States Patent
Place

(10) Patent No.: US 8,511,433 B2
(45) Date of Patent: Aug. 20, 2013

(54) TREE STAND HOIST SYSTEM

(76) Inventor: Brent Place, Hager City, WI (US)

( * ) Notice: Subject to any disclaimer, the term of this patent is extended or adjusted under 35 U.S.C. 154(b) by 417 days.

(21) Appl. No.: 12/834,238

(22) Filed: Jul. 12, 2010

(65) Prior Publication Data
US 2012/0007029 A1    Jan. 12, 2012

(51) Int. Cl.
*A63B 27/00* (2006.01)
*A01M 31/00* (2006.01)

(52) U.S. Cl.
USPC ........ 182/133; 182/187; 182/188; 248/218.4; 248/219.1

(58) Field of Classification Search
USPC ............. 254/261, 262, 263, 329, 334, 335, 254/337, 342, 357, 376, 380; 182/133, 187, 182/188; 248/218.4, 219.1, 219.4, 230.4, 248/230.5, 230.6
See application file for complete search history.

(56) References Cited

U.S. PATENT DOCUMENTS

| | | | |
|---|---|---|---|
| 3,165,297 A * | 1/1965 | Thompson, III et al. ..... | 254/344 |
| 3,944,022 A * | 3/1976 | Ming ............................... | 182/20 |
| 3,951,236 A * | 4/1976 | Schreiber et al. ............. | 187/241 |
| 3,955,645 A * | 5/1976 | Dye ............................... | 182/135 |
| 4,161,233 A * | 7/1979 | Wirtz ............................ | 182/187 |
| 4,205,733 A * | 6/1980 | Wade ............................ | 182/142 |
| 4,239,188 A * | 12/1980 | Hobbs ........................... | 254/376 |
| 4,314,693 A * | 2/1982 | Hobbs ........................... | 254/376 |
| 4,688,657 A * | 8/1987 | Erickson ...................... | 182/142 |
| 4,694,934 A * | 9/1987 | Erickson ...................... | 182/142 |
| 5,263,675 A * | 11/1993 | Roberts et al. ............. | 248/219.4 |
| 5,303,899 A * | 4/1994 | Palya ............................ | 254/334 |
| 5,388,664 A * | 2/1995 | Bator ............................ | 182/100 |
| 5,522,186 A * | 6/1996 | Jarman ........................ | 52/73 |
| 5,603,489 A * | 2/1997 | Regal .......................... | 254/378 |
| 5,607,143 A * | 3/1997 | Regal .......................... | 254/342 |
| 5,685,393 A * | 11/1997 | Early ........................... | 182/133 |
| 6,045,442 A * | 4/2000 | Bounds ........................ | 452/187 |
| 6,202,964 B1 * | 3/2001 | Thornhill .................... | 248/219.4 |
| 6,382,356 B1 * | 5/2002 | Skinner et al. .............. | 182/133 |
| 6,578,823 B1 * | 6/2003 | Johnson ....................... | 254/334 |
| 6,739,964 B2 * | 5/2004 | Gearhart ...................... | 452/187 |
| 7,314,406 B2 * | 1/2008 | Bilinovich ................... | 452/185 |
| 7,350,769 B1 | 4/2008 | Dorzok | |
| 7,458,563 B1 | 12/2008 | Liu | |
| 7,690,481 B1 * | 4/2010 | Pederson ..................... | 182/133 |
| 7,717,232 B2 * | 5/2010 | Butcher ....................... | 182/178.3 |

(Continued)

*Primary Examiner* — Basil Katcheves
*Assistant Examiner* — Rodney Mintz
(74) *Attorney, Agent, or Firm* — Nikolai & Mersereau, P.A.; Thomas J. Nikolai

(57) ABSTRACT

A hoist for elevating a hunter's tree stand from the ground to a vertical position alongside of the trunk of a tree comprises a segmented, extendable and contractible pole having a tree clamping ring assembly pivotally mounted to the top section of the pole and a V-shaped jaw for engaging the tree trunk near the bottom of the pole. A first rope is tied at one end to the clamping ring assembly and extends down to a retractable reel located near the bottom of the pole. By pulling on this rope, the clamping ring assembly can be pivoted to an angle allowing the ring to pass about the tree trunk and when released, the clamping ring assembly pivots downward under the force of gravity which secures the pole to the tree at its upper end. The clamping ring assembly further includes a pulley, about which a second rope is deployed. One end of the second rope is adapted to be connected to the hunter's tree stand at its upper end and the other end can be pulled on to elevate the tree stand.

11 Claims, 2 Drawing Sheets

(56) References Cited

U.S. PATENT DOCUMENTS

| | | | |
|---|---|---|---|
| 7,861,987 B2 * | 1/2011 | Gorsuch et al. | 248/219.1 |
| 7,913,980 B1 * | 3/2011 | Cipriano | 254/393 |
| 2004/0026675 A1 * | 2/2004 | Green et al. | 254/326 |
| 2004/0154866 A1 * | 8/2004 | Schmidt | 182/133 |
| 2005/0136816 A1 * | 6/2005 | Lake | 452/128 |
| 2005/0247525 A1 * | 11/2005 | Thornton | 182/230 |
| 2007/0017744 A1 * | 1/2007 | Jacks | 182/187 |
| 2007/0089932 A1 * | 4/2007 | Boyett | 182/133 |
| 2008/0169155 A1 | 7/2008 | Broberg | |
| 2009/0272709 A1 | 11/2009 | Nessner et al. | |
| 2010/0018102 A1 * | 1/2010 | Minges | 42/94 |
| 2011/0260127 A1 * | 10/2011 | Surgeon et al. | 254/362 |
| 2011/0291062 A1 * | 12/2011 | Lukes | 254/334 |
| 2013/0001385 A1 * | 1/2013 | Green | 248/218.4 |

* cited by examiner

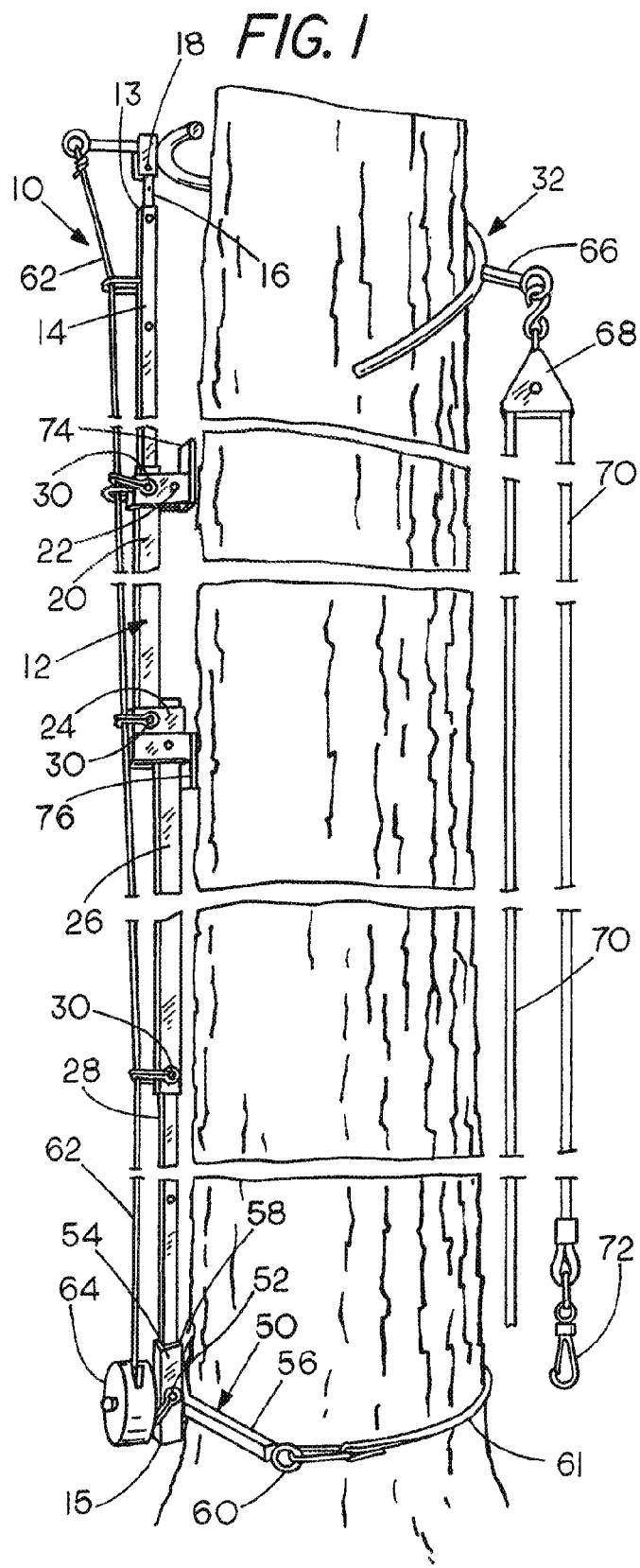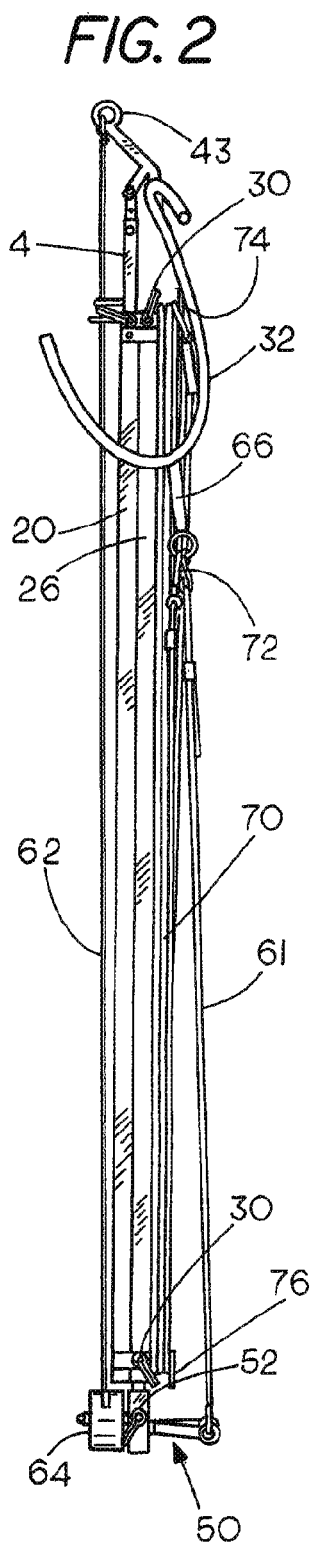

TREE STAND HOIST SYSTEM

BACKGROUND OF THE INVENTION

I. Field of the Invention

This invention relates generally to hunting equipment, and more particularly to a device for facilitating erection of a hunter's tree stand.

II. Discussion of the Prior Art

As is explained in U.S. Pat. No. 7,717,232, to Butcher, the teachings of which are hereby incorporated by reference, hunters after deer and other game often employ a tree stand to position themselves off the ground and out of sight of prey. The tree stand generally comprises a ladder formed of plural ladder segments that can be joined together to reach a desired length. A platform is joined to an upper ladder rung and a safety railing and seat are joined to the upper ends of the ladder's side rails as shown in the Butcher '232 patent.

The assembled tree stand may typically be 20 feet or more in length and may weigh about 100 pounds. Hence, it is somewhat of a challenge for a single person to lift and position a tree stand against a support tree. Furthermore, the hunter must mount the ladder of the tree stand in order to safely secure it with rope or straps to a tree trunk against which it is made to lean. Until it is secured, there is a risk that the tree stand assembly may shift and potentially fall, causing injury to the hunter.

The Liu, U.S. Pat. No. 7,458,563, describes a hoist device that involves a crank-operated winch mechanism adapted to be strapped to the trunk of a tree and having a cable deployed over a pulley that is suspended from a tree limb at an elevated location on a tree trunk. The free end of the cable is adapted to be coupled to the safety rail of the tree stand and by turning the crank of the winch, the tree stand is made to assume a vertical disposition along side of the tree trunk.

The Liu invention has several drawbacks. First, the ability to suspend the pulley from the tree limb requires that the hunter find a tree with a lower branch at the desired height. Then a degree of skill is required for the hunter, standing on the ground, to lob a rope to which the pulley is attached over the selected tree limb, especially when the winch cable is looped about the pulley as it must be.

Another tree stand hoist is disclosed in U.S. Pat. No. 7,350,769 to Dorzok. It comprises a long pole having an elongate member attached at its distal end where the elongate member is provided with a plurality of regularly spaced apertures along the length dimension thereof. Affixed to the end of the elongate member is a stationary, folding, articulated arm. Slidably mounted on the elongate member is a movable arm and a spring-actuated locking pin arrangement that can be used to lock the movable arm at a selected location along the length of the elongate member with the locking pin inserted into one of the apertures on the elongate member. In this manner, the elongate member can be raised to a desired height by means of the pole and the movable arm slid along the elongate member so the tree trunk is captured between the stationary arm and the movable arm. Once the assembly is clamped to a tree, a rope or cable that is disposed over a pulley suspended from the movable arm can be used to raise a tree stand to a vertical disposition against the tree trunk. The spring actuated locking pin is manipulated by the user pulling on a further rope to thereby extract the pin from the aperture it is occupying and allowing the movable arm to be moved.

While the device the '769 patent overcomes drawbacks of the Liu '563 patent, it has drawbacks of its own. The mechanism is overly complicated, costly to manufacture and requires considerable manual dexterity to deploy. Since the stationary arm and movable arm must clamp to the tree so not as to slide down as the tree stand is being raised, these arms must be substantial and, hence, the amount of weight cantilevered from the end of the pole makes placement thereof by a person holding, say, a 20 foot long pole, quite difficult to say the least.

Accordingly, a need exists for a hunter's tree stand hanger that is inexpensive to manufacture, easy to transport to a hunting site and assemble and easy to deploy and use. The present invention provides just such a hoist mechanism.

SUMMARY OF THE INVENTION

The present invention comprises an apparatus for elevating and securing a hunter's tree stand to a selected tree. The hoist has an elongated rigid pole that may include telescoping, extendable segments, where the pole has an upper end and a lower end when oriented vertically. A tree clamp ring is pivotally attached to the upper end of the rigid pole. A V-shaped jaw is affixed toward the lower end of the pole for at least partially surrounding the trunk of a tree proximate the ground. A first length of rope has one end coupled to the tree clamping ring and its other end extending down to a location that can be reached by a person on the ground and when pulled, pivots the tree clamp ring to a predetermined angle to the axis of the pole. Affixed to the tree clamp ring is a pulley having a second length of rope looped about it and having one end adapted to be attached to a tree stand proximate its upper end and a second end of the rope adapted to be grasped by the hunter standing on the ground and pulled to thereby raise the upper end of the tree stand to a location proximate the upper end of the pole. The tree clamping ring is split and bent to form a segment of a helix so as to allow the clamping ring to fit about a tree trunk when the ring pivoted to said predetermined angle, but which is in tight engagement with the tree trunk when at other than this angle.

DESCRIPTION OF THE DRAWINGS

The foregoing features, objects and advantages of the invention will become apparent to those skilled in the art from the following detailed description of a preferred embodiment of the invention, especially when considered in conjunction with the accompanying drawings in which like numerals in the several views refer to corresponding parts.

FIG. 1 is a perspective view of a preferred embodiment of the present invention in its extended condition and engaging a tree trunk;

FIG. 2 is a perspective view of the invention in its collapsed condition for transport to and from a hunting site.

DESCRIPTION OF THE PREFERRED EMBODIMENT

Figure 3:
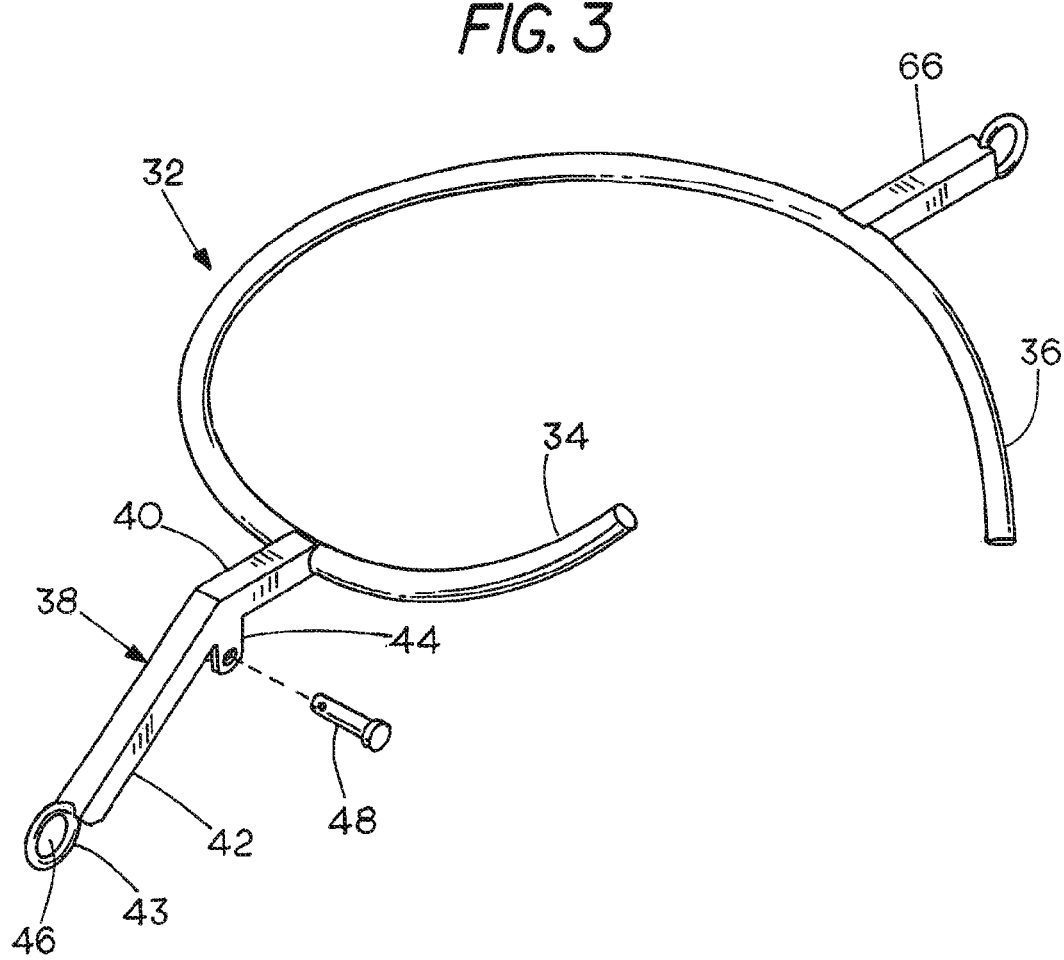
FIG. 3 is a view of the clamping ring component of the hoist device.

This description of the preferred embodiments is intended to be read in connection with the accompanying drawings, which are to be considered part of the entire written description of this invention. In the description, relative terms such as "lower", "upper", "horizontal", "vertical", "above", "below", "up", "down", "top" and "bottom" as well as derivatives thereof (e.g., "horizontally", "downwardly", "upwardly", etc.) should be construed to refer to the orientation as then described or as shown in the drawings under discussion. These relative terms are for convenience of description and do not require that the apparatus be constructed or operated in a particular orientation. Terms such as "connected", "connecting", "attached", "attaching", "join" and "joining" are used interchangeably and refer to one structure or surface being secured to another structure or surface or integrally fabricated in one piece, unless expressively described otherwise.

Referring to FIG. 1, the tree stand hoist of the present invention is indicated generally by numeral 10 and is seen to comprise an elongated, multi-segment, extendable and contractible pole 12 having an upper end 13 and a lower end 15. The pole itself comprises a plurality of sections, each being in a range of 5' to 7' in length and that either telescope or slide relative to one another so as to be extendable and contractible. The uppermost pole segment 14 has a short rod 16 welded to its upper end and that rod has an aperture 18 drilled laterally through it. This upper pole segment 14 may comprise a tube of rectangular cross-section whose outside dimensions permit it to slidingly fit within the lumen of a second tubular segment 20. Without limitation, the uppermost pole segment 14 may be about 6½ feet in length and its outside square dimension may be 0.875 inch. The pole segment 20 in which pole segment 14 is telescopingly received may have a 1 inch square cross-section. Again, without limitation, the second pole segment may be about 6 feet in length. While the pole segments of the preferred embodiment comprise square tubing, extruded tubes of other cross-sectional shapes may be used.

Welded proximate the opposed ends of the second tubular segment 20 are rectangular brackets 22 and 24 that form bands through which a third pole segment 26 is arranged to fit so that it is able to slide along side an exterior surface of the pole 20 for substantially the full length thereof. In the exemplary embodiment, the bands 22 and 24 may extend above the height dimension of the rectangular tube segment 26 sufficiently far to accommodate outer dimensions of the pole segment 20, e.g., 1 inch square. The pole segment 26 is equal in length to the pole segment 20.

There is fitted within the lumen of the pole segment 26 a further pole segment of rectangular cross-section and that is identified in FIG. 1 by numeral 28. The pole segment 28 may also be approximately 6½ feet in length so that when fully extended, the overall length of the pole 12 is approximately 23 feet.

Transversely extending through holes are strategically placed along the lengths of the four pole segments so that removable pins, as at 30, may be inserted through aligned holes (not shown) in the mating pole segments to hold the four segments in a fully extended or partially extended state so that the extent of reach of the pole can be adjusted.

Pivotally affixed to the rod 16 extending from the upper end of the pole segment 14 is a split-ring tree clamp indicated generally by numeral 32. More particularly, and is shown in FIG. 3, the tree clamp ring comprises a steel or aluminum rod that has been bent so as to be somewhat circular over an arc of about 180° with a first end extension 34 bent upward at an angle of about 50° out of the plane of the 180° arc. The other end extension 36 extends downward at about a 50° angle to the plane of the 180° arc. The lengths of the two extensions are such that a gap exists between the ends of the two extensions.

Welded to the ring 32 is a pivot arm 38 comprising a first segment 40 laying generally in the plane of the semicircular arc and an integrally formed downwardly projecting arm member 42 terminating in a toroid-shaped eyelet 43 defining an opening 46. Located at the transition between the arm segments 40 and 42 are downwardly depending ears 44 with aligned apertures. The ears are designed to fit about the rod 16 and with a hinge pin or bolt 48 extending through the aligned apertures and a mating aperture 18 in the rod segment to form a clevis connection.

With reference again to FIG. 1, fitted onto the lower end 15 is a V-shaped jaw assembly 50 that is designed to at least partially surround the trunk of a tree proximate the ground. It is removably affixed to the lower end of the pole segment 26 by a pin 52 designed to extend through aligned holes in a stem portion 54 into which the lower end of the pole 26 is inserted. The leg members 56 and 58 of the V-shaped jaws are welded at one end to the stem portion 54 and the outer ends of each leg includes a ring 60 by which a strap 61 of adjustable length may be clipped where the strap 61 is made to extend the remainder of the way around the trunk of the tree against which the hoist 10 of the present invention is being secured.

A cord 62 is joined to the ring 43 of pivot arm 38 extending from the clamping ring 32 and the other end of this cord is preferably affixed to a retractable reel 64 mounted on the stem portion 54 of the V-shaped jaws. Spring tension on the reel serves to maintain the cord 62 in a taut condition. A hunter using the hoist of the present invention can pull downward on this cord to rotate or pivot the tree clamping ring to an angle of about 45° relative to the extended pole 12 at which point, the tree clamping ring can be made to fit about the tree trunk at its elevated location atop pole 12. When the cord 62 is again released, the tree clamping ring, under the force of gravity, will fall to a position precluding the clamping ring 32 from being pulled free of the tree trunk which it surrounds. Thus, the V-shaped jaw assembly 50 and associated strapping 61 used at the base of the tree and the tree clamping ring 32 proximate the upper end of the pole will hold the extended pole 12 locked relative to the tree trunk.

Suspended from an arm 66 welded to the tree clamping ring 32 at a location directly opposite the pivot arm 38 is a pulley 68 about which is draped a rope 70 having a spring clip 72 tied to one end thereof. The rope 70 is of a length such that with the pole 12 fully extended, the spring clip 72 can be secured to a tree stand (not shown) proximate an upper end thereof while the tree stand is laying generally horizontally on the ground and the other end of the rope is hanging down so that a hunter standing on the ground may grasp it. By pulling on the free end of this rope, the upper end of the tree stand will be lifted off the ground and continued pulling down on the rope draped about the pulley 68 will elevate the tree stand to a vertical position adjacent the tree trunk. At this point, the hunter may climb the ladder of the tree stand and secure the tree stand's platform and seat to the tree trunk using suitable straps. Because at this point in time the tree stand remains fastened to the hoist via the connection of the pulley to the clamping ring, the tree stand's ladder can be climbed without concern that it can shift and possibly cause the hunter to fall as the hunter uses straps to secure the tree stand to the trunk of the tree.

Now, by again pulling down on the cord 62 to rotate the clamping ring to its 45° orientation, the clamping ring can now be removed from the tree trunk. By pulling out the pins 30, the hoist can be compacted into its contracted state illustrated in FIG. 2 of the drawings. Again, reinsertion of the pins into aligned holes in the mating members of the segmented pole will retain it in its contracted state.

When not in use, the rope 70 may conveniently be wrapped around upper and lower retainers 74 and 76 welded to the brackets 22 and 24 for storage and to prevent tangling thereof.

The present invention provides a hoist for a tree stand that is easy to transport in a contracted state but that can be extended to reach an appreciable height to accommodate most commercially-available tree stands that are typically between 15 and 20 feet in height. The change in direction of the applied force through the use of the elevated pulley makes it much easier for the hunter to elevate a tree stand than when no hoist mechanism is used.

This invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment and operating procedures, can be accomplished without departing from the scope of the invention itself.

What is claimed is:

1. A system for elevating and securing a hunter's tree stand to a tree, comprising:
   (a) an elongated, rigid pole having upper and lower ends;
   (b) a generally helical tree clamp ring pivotally attached to the upper end of said pole, said tree clamp ring including a pivot leg projecting radially outward and therefrom, said pivot leg being rotatably pinned to the upper end of the pole;
   (c) a V-shaped jaw having first and second spaced-apart ends affixed to the lower end of the pole for at least partially surrounding a trunk of the tree proximate ground level, the first and second ends adapted to be connected by an adjustable length strap wrapped about the trunk;
   (d) a first length of rope having one end coupled to the tree clamp ring and another end extending down to a location that can be reached by a person on the ground level which when pulled pivots the tree clamp ring about the upper end of said pole to a first predetermined angle at which the tree clamp ring is configured to fit about the trunk and a second predetermined angle where the trunk is captured within the tree clamp ring;
   (e) a pulley affixed to the tree clamp ring at a location opposite the pivotal attachment of the tree clamp ring to the upper end of the pole; and
   (f) a second length of rope looped about the pulley having one end adapted to be attached proximate an upper end of the tree stand and a second end of the second length of rope adapted to be grasped by the person on the ground level and pulled to thereby raise the upper end of the tree stand to a location proximate the upper end of the pole.

2. The system of claim 1, wherein the pole is extendable.

3. The system of claim 1, wherein said pole comprises a plurality of tubular sections that are extendable and retractable relative to one another.

4. The system as in claim 1, wherein said pole comprises a plurality of telescoping sections.

5. The system of claim 4, wherein each of the telescoping sections is of a length in a range of from 5 ft, to 7 ft.

6. The system as in claim 1, wherein the tree clamp ring is generally semicircular in shape over a predetermined arc.

7. The system of claim 6, wherein a point of attachment of the pulley to the tree clamp ring is about 180° from the pivot leg.

8. The system of claim 6, wherein the one end of the first length of rope is tied to the pivot leg.

9. The system of claim 8, and further including a retractable spring-loaded reel mounted on the V-shaped jaw and to which said another end of the first length of rope is connected.

10. The system of claim 8, wherein the tree clamp ring is made to fit about the tree trunk when the pivot leg is positioned at the second predetermined angle by the person on the ground level using the first length of rope to manipulate the pivot leg.

11. The system as in claim 10, wherein the first predetermined angle is about 45 degrees.

\* \* \* \* \*